United States Patent
Togawa et al.

(10) Patent No.: US 6,290,142 B1
(45) Date of Patent: Sep. 18, 2001

(54) COGENERATION APPARATUS

(75) Inventors: Kazuhiro Togawa; Kichitarou Oyama, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/533,973

(22) Filed: Mar. 23, 2000

(30) Foreign Application Priority Data

Apr. 14, 1999 (JP) .................................................. 11-106296

(51) Int. Cl.$^7$ ...................................................... B60H 1/02
(52) U.S. Cl. ........................................... 237/12.1; 165/299
(58) Field of Search ........................... 237/12.1; 165/299, 165/48.1; 290/2

(56) References Cited

U.S. PATENT DOCUMENTS

| | | | |
|---|---|---|---|
| 2,696,085 | * 12/1954 | Ruff | 237/12.1 |
| 3,604,501 | * 9/1971 | Brants | 165/1 |
| 4,065,055 | * 12/1977 | De Cosimo | 237/12.1 |
| 5,819,843 | * 10/1998 | Inoue et al. | 165/219 |

FOREIGN PATENT DOCUMENTS 8-4586 * 1/1996 (JP) .

* cited by examiner

*Primary Examiner*—Harold Joyce
*Assistant Examiner*—Derek S. Boles
(74) *Attorney, Agent, or Firm*—Armstrong, Westerman, Hattori, McLeland & Naughton, LLP

(57) ABSTRACT

A cogeneration apparatus is arranged to properly respond to a plurality of separate demands for supplying the thermal energy. A hot water storage tank 17 is provided for storing a first hot water produced using waste heat from an engine generator 10. A first heat exchanger 20 for producing the first hot water and a second heat exchanger 22 for producing a second hot water by drawing heat from the first hot water are provided in the hot water storage tank 17. A temperature sensor TS1 is provided between the first heat exchanger 20 and the second heat exchanger 22 while a second temperature sensor TS2 is provided above the second heat exchanger 22. A controller 29 control the operation of the engine generator 10 in response to the conditions of thermal loads 21 and 24 determined by the measurements of temperature detected by the temperature sensors TS1 and TS2. Also, a re-heating boiler 25 is provided for heating the second hot water to be supplied to the thermal load 24.

6 Claims, 1 Drawing Sheet

COGENERATION APPARATUS

BACKGROUND OF THE INVENTION

1. Field of the Invention

The present invention relates to a cogeneration apparatus including a power generator equipment and particularly a cogeneration apparatus capable of properly supplying thermal energy in response to variable requirements of heat.

2. Description of the Related Art

Recently, cogeneration apparatuses applied as on-site power generation utilities for generating electric power and distributing hot water simultaneously with the use of a power source such as a gas engine fueled with town gas have been focused in view of the preservation of the global environments. Such a cogeneration apparatus includes a particular means for minimizing any loss of the thermal energy because the heat produced during the generation of electric power is not always required to consume immediately, although it is ready to be taken out upon the request of supply. For example, a cogeneration system disclosed in Japanese Patent Unexamined Publication (Hei) 8-4586 incorporates a hot water storage tank for saving a volume of hot water, which has been heated by the thermal energy produced with a power generator.

The conventional cogeneration system disclosed in the Publication has an advantage that the thermal energy is saved but not wasted in the air and will thus enable to satisfy any demand of heat supply occurring during out of operation of the power generation. It is however necessary to satisfy a variety of different demands including the supply of hot water and the requirement of heating through responding to each variable of the demand of the thermal energy separately. The problem is that any of the conventional cogeneration systems is hardly capable of satisfying a number of the variable demands for the thermal energy.

SUMMARY OF THE INVENTION

It is thus an object of the present invention to provide a cogeneration apparatus capable of supplying thermal energy properly in response to a plurality of separate demands for supplying the heat energy.

As a first feature of the present invention, a power generator, a hot water storage tank for storing a first hot water heated by waste heat from the power generator, a first heat exchanger provided in the hot water storage tank for producing the first hot water, a second heat exchanger provided above the first heat exchanger in the hot water storage tank for drawing heat from the first hot water to produce a second hot water, a first temperature sensor provided between the uppermost end of the first heat exchanger and the lowermost end of the second heat exchanger, and a controller arranged responsive to a temperature detected by the first temperature sensor for controlling the operation of the power generator.

As a second feature of the present invention, a second temperature sensor provided above the second heat exchanger and wherein the controller drives the power generator either when a temperature detected by the first temperature sensor is not higher than a first reference temperature or when a temperature detected by the second temperature sensor is not higher than a second reference temperature which is set higher than the first reference temperature. As a third features of the present invention, the power generator is stopped when the temperature detected by the first temperature sensor exceeds a third reference temperature which is set higher than the first reference temperature.

As a forth feature of the present invention, the first reference temperature is set to a higher level than the temperature of hot water required by a thermal load to which the second hot water is supplied. As a fifth feature of the present invention, a re-heating boiler provided on a hot water passage connected to the second heat exchanger, and a valve means for switching between one operation of conveying the second hot water from the re-heating boiler to the thermal load connected across the hot water passage and the other operation of returning back at least a portion of the hot water to the second heat exchanger while bypassing the thermal load.

As a sixth feature of the present invention, the power generator is an engine generator which is interconnected with a commercial power system and driven according to a driving command from the controller to generate a constant rate of an electric power.

According to the first to sixth features of the present invention, the apparatus can yield and distribute the thermal energy collected from its generator system in response to two different demands of heat through judging whether or not the demand of heat is called and examining the temperature of the hot water in the hot water storage tank to determine the level of the demand and thus to control the operation of the generator system. In particular, the second feature of the present invention allows the generation of heat corresponding to two independent demands of heat, which are different in the temperature required.

According the fourth feature of the present invention, the temperature of water detected by the first temperature sensor can be monitored and used for supplying the hot water at a temperature requested by the thermal load. According to the fifth feature, the hot water received from the re-heating boiler can be delivered to the hot water storage tank or the second demand of heat as successfully respond to an abrupt change in the demand of heat.

According to the sixth feature of the present invention, the power supply can be guaranteed by the commercial power supply system when the engine generator is out of operation, and therefore, the engine generator is permitted to run stably at a constant speed of revolution.

DETAILED DESCRIPTION OF THE PREFERRED EMBODIMENTS

Figure 1:
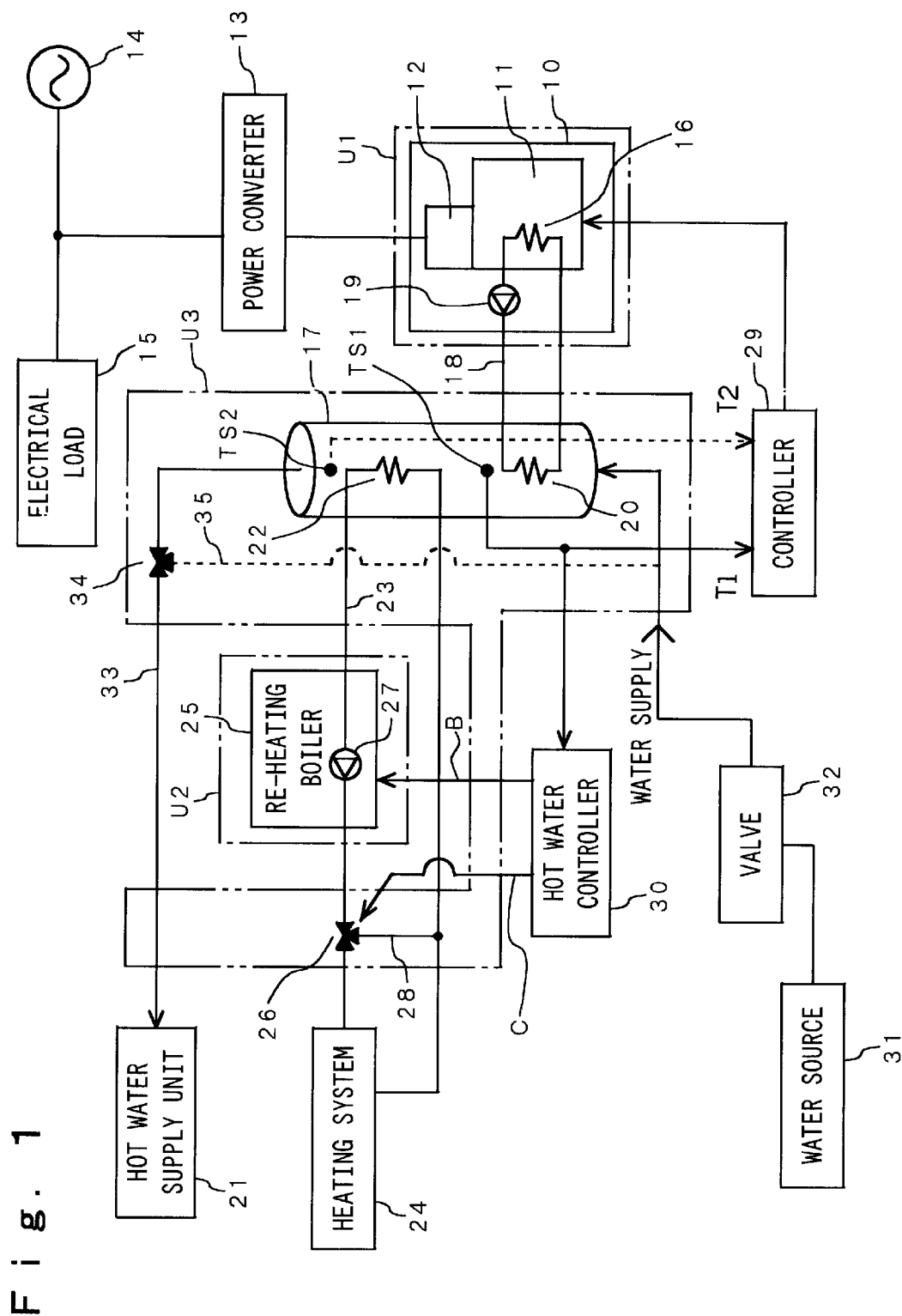
FIG. 1 is a block diagram of an arrangement of the cogeneration apparatus according to one embodiment of the present invention.

One embodiment of the present invention will be described in detail referring to the accompanying drawing. FIG. 1 illustrates an arrangement of a cogeneration apparatus having an engine power generator in its power generator section interconnected to a commercial power supply system. The engine generator 10 includes an (internal combustion) engine 11 and a power generator 12 connected mechanically to each other. The power generator 12 is driven by the engine 11 to generate a power of alternating current corresponding to the revolution of the engine 11.

A power converter 13 has a function of converting the AC output generated by the power generator 12 to an AC current of which the characteristics (of voltage, frequency, noise, etc.) are identical to those of the commercial power supply system and developing synchronization of the phase with the commercial power supply system. More particularly, the power converter 13 comprises a converter for converting the AC output released from the power generator 12 into a DC output, an inverter for inverting the DC output of the converter into an AC form which is identical in the frequency and the voltage to an input from the commercial power supply system, and other functional means including noise filters and interconnecting switches. An example of the power converter interconnected with the other (commercial) systems is disclosed in Japanese Patent Examined Publication (Hei) 4- 10302. The AC output generated by the power generator 12 and converted by the power converter 13 is then supplied to an electrical load 15, which is also connected with the commercial power supply system 14.

The heat generated by the engine 11 for driving the power generator 12 is collected through a thermal exchange operation of a water cooling device 16. The collection of the heat may preferably be made from all the heated components including a muffler of the engine 11. The cooling water supplied to the water cooling device 16 is circulated throughout a conduit 18 by the operation of a pump 19 as used as a medium for carrying the heat to a hot water storage tank 17. The hot water storage tank 17 contains a heat exchanger (referred to as a first heat exchanger hereinafter) 20 communicated with the conduit 18. The water supplied from a water source 31 to the hot water storage tank 17 is then heated by the first heat exchanger 20 to turn to a hot water. The hot water heated and saved in the hot water storage tank 17 is fed for further use to a hot water supply unit 21, which is a first thermal load.

A valve 32 is connected between the water source 31 and the hot water storage tank 17. The valve 32 is opened for supplying the water when the hot water in the hot water storage tank 17 decreases to below a predetermined level. The pump 19 which starts operating in synchronism with the engine generator 10 may automatically be switched off after a preset length of time (determined by a timer) since the engine generator 10 stops. The pump 19 may be switched on upon the temperature of the engine 11 rising up to higher than that of the hot water storage tank 17. In this specification, the engine generator 10 accompanied with the water cooling device 16 and the pump 19 is called "a cogeneration unit".

A second heat exchanger 22 is provided above the first heat exchanger 20. The second heat exchanger 22 is communicated to a conduit 23, which in turn connects with a heating system 24, such as a central heating system or a floor heating system, acting as a second thermal load. The second conduit 23 forms a second hot water circuit, which is separated from the hot water circuit for supplying the hot water from the hot water storage tank 17 to the hot water supply unit 21. The second hot water circuit 23 performs secondary exchange of the heat from the hot water storage tank 17 thus increasing the efficiency.

The second heat exchanger 22 is located at a position higher than the first heat exchanger 20 because the hot water generated by the first heat exchanger 20 has a higher temperature and convectively flows upwardly from the first heat exchanger 20. This allows the second heat exchanger 22 to take up more thermal energy from the hot water moved upward by the effect of convection.

In the second hot water circuit 23, there are also provided a re-heating boiler 25 and a three-directional valve 26. The re-heating boiler 25 is provided with a pump 27 for circulating the hot water throughout the second hot water circuit 23. The three-directional valve 26 is a means for switching the flow of the hot water to a bypass 28 or to the heating system 24. The following passages are selected by operating the three-directional valve 26. When the three-directional valve 26 is switched to the heating system 24, the passage is opened for conveying the hot water via the re-heating boiler 25 and the heating system 24 from and to the hot water storage tank 17. When the three-directional valve 26 is switched to the bypass 28, the passage is opened for conveying the hot water via the bypass 28, not the heating system 24, from and to the hot water storage tank 17.

A temperature sensor TS1 is provided in the hot water storage tank 17 and information about the temperature TI of the hot water measured by the temperature sensor TS1 is transmitted to a controller 29. The temperature sensor TS1 may be located at an appropriate height level between substantially the uppermost of the first heat exchanger 20 and the lowermost of the second heat exchanger 22 and most preferably at a midway between the first heat exchanger 20 and the second heat exchanger 22. It is very likely that, due to the effect of convection, the temperature of the hot water is lower at substantially the lowermost of the hot water storage tank 17 and higher at substantially the uppermost. As the temperature sensor TS1 is located at the midway, it can detect an average value of the temperature in the hot water storage tank 17.

In response to the temperature information TI, the controller 29 controls the start and stop operation of the engine 11. Since the temperature information TI represents the demand of heat from the hot water supply unit 21 which draws the hot water directly from the hot water storage tank 17 or from the heating system 24 which draws the hot water indirectly via the second heat exchanger 22, the controller 29 judges that the demand exceeds when the temperature information TI is not higher than a reference level Tref-1 and drives the engine 11 to generate the heat. On the other hand, when the temperature information TI is higher than the reference level Tref-1, the controller 29 judges that a sufficient level of the heat energy is saved in the hot water storage tank 17 and stops the operation of the engine 11.

The reference level Tref-1 of the temperature is determined from multiple parameters of the type and the magnitude of the thermal load (i.e. the type and the capacity of the hot water supply unit 21 and the heating system 24), the thermal output of the cogeneration unit 10, the volume of the hot water storage tank 17, and so on. The reference level Tref-1 has a hysteresis for ensuring a stable operation of the engine 11, i.e. avoiding frequent start and stop operations.

In case that the engine 11 is controlled with the temperature information TI, its operation may be contemplated for driving the power generator 12 to generate a constant power output or, in an electrical load dependent mode, to generate a variable output depending on the magnitude of the electrical load 15. In the constant power output mode, the engine 11 as a driving power source is operated to make the number of its revolutions constant and thus its operation will ensure a higher level of the efficiency minimizing the consumption of fuel and releasing an acceptable level of the exhaust gas. If the demand of electricity exceeds the output of the power generator 12, a deficiency in the electricity is covered by the supply from the commercial power supply system 14.

The temperature of the hot water in the hot water storage tank 17 is significantly varied depending on the consumption of the hot water, i.e. the demand of thermal energy, and the mode of the operation of the engine generator 10, e.g. either the constant output mode or the electrical load dependent mode. For example, in a system where when the consumption of the hot water is low, the temperature of the hot water can be maintained to about 80° C. with the cogeneration unit 10 operating in response to the temperature measurement detected by the temperature sensor TS1, either abrupt, bulky consumption of the hot water resulting from the demand of heat given simultaneously from both the hot water supply unit 21 and the heating system 24 or the startup of the system may cause the temperature of the hot water in the hot water storage tank 17 to drop down to as a low degree as of the cool water supplied.

In case that the reference temperature of the hot water in the hot water storage tank 17 is hardly maintained with the heat collected from the cogeneration unit 10, the re-heating boiler 25 functions effectively. The hot water controller 30 provides the re-heating boiler 25 and the three-directional valve 26 with a command "B" for re-heating and a command "C" for switching, respectively. The hot water controller 30 is preset with a lower reference temperature Tref-L which is lower than the reference temperature Tref-1 and when the temperature T1 of the hot water in the hot water storage tank 17 drops down to lower than the lower reference temperature Tref-L, it turns on the re-heating command "B" and the switching command "C". As the re-heating command "B" is turned on, the re-heating boiler 25 starts operating. As the switching command "C" is turned on, the three-directional valve 26 shifts its passage to the bypass 28. Accordingly, the hot water heated by the re-heating boiler 25 circulates through the conduit 23 and increases the temperature of the hot water in the hot water storage tank 17 via the second heat exchanger 22.

When the temperature of the hot water in the hot water storage tank 17 exceeds the lower reference temperature Tref-L, the re-heating command "B" and the switching command "C" are turned off to stop the operation of the re-heating boiler 25 and switch the three-directional valve 26 to the heating system 24 for the heating operation. The lower reference temperature Tref-L has a hysteresis analogous to that of the reference temperature Tref-1.

As mentioned above, when the three-directional valve 26 has been switched to the bypass 28, the supply of the hot water to the heating system 24 stops. When the operation of the hot water supply unit 21 is to deliver the hot water to a bath or a kitchen, such delivery is rarely continued for an extensive length of time and thus stopping the supply of the hot water to the heating system 24 is also within only minutes. On the other hand, in the heating system 24 acting as the thermal load, the demand of the heat is rather moderate once the temperature in the room to be heated has risen up to its desired degree. Accordingly, since the temperature in the room seldom drops down extremely low, there may unlikely be the occurrence of any problem in the practice.

Moreover, when the demand of the heat at the heating system 24 increases, the re-heating boiler 25 is turned on with the three-directional valve 26 switched to the heating system 24 thus to readily support the heating system 24 with a sufficient supply of the hot water. Increase of the demand of the heat at the heating system 24 may be judged based on a desired temperature preset in the heating system 24. It is also possible to have the three-directional valve 26 variable in the opening for returning at least a part of the hot water in the conduit 23 to the second heat exchanger 22 instead of switching of the entire flow of the hot water with the three-directional valve 26.

A second embodiment of the present invention will now be described. While the temperature sensor TS1 is provided in the hot water tank 17 of the previous embodiment, a second temperature sensor TS1 is added. As shown in FIG. 1, the second temperature sensor TS2 is located above the temperature sensor TS1 and more preferably at a position higher than the second heat exchanger 22. When the temperature information T1 detected by the temperature sensor TS1 is lower than the reference temperature Tref-1 and/or a temperature information T2 detected by the second temperature sensor TS2 is lower than the reference temperature Tref-2, the controller 29 drives the cogeneration unit 10. It is assumed that the reference temperature Tref-2 is set to a higher degree than the reference temperature Tref-1. For example, the reference temperature Tref-1 is 40° C. while the reference temperature Tref-2 is 58° C.

The cogeneration unit 10 arranged for actuating when the temperature information T1 or the temperature information T2 is lower than the reference level is responsive to two kinds of thermal loads, i.e. the hot water supply unit 21 and the heating system 24. There is likely developed a condition that the hot water is higher than the level of the temperature information T1 satisfying the demand of a lower temperature of the thermal load but lower than the level of the temperature information T2 satisfying the demand of a higher temperature of the thermal load and vice versa. The two temperature sensors provided at the upper and lower regions in the hot water storage tank 17 can follow a variation in the temperature profile in the hot water storage tank 17 caused by change of the load.

The cogeneration unit 10 is switched off when the temperature information T1 measured by the temperature sensor TS1 exceeds a reference temperature Tref-3 (for example, 70° C.) which is set higher than the reference temperature Tref-1. The temperature information T1 measured by the temperature sensor TS1 reaching the reference temperature Tref-3 indicates that the thermal energy saved in the hot water storage tank 17 is satisfactory.

While the reference temperature Tref-1 is preset to a value higher than the temperature of the hot water to be used by the thermal load (the heating system 24 in this embodiment) connected to the conduit 23, any change in the demand of the heat can be supported by a single means for monitoring the temperature information T1 measured by the temperature sensor TS1 to issue the start or stop commands for the cogeneration unit 10 with no use of additional elements.

Also, the controller 29 may include a clock device, which determines an operation time in a day during which the start and stop operations of the cogeneration unit 10 are controlled on the basis of the temperatures measured by the temperature sensors TS1 and TS2. It is optional to operate the cogeneration unit 10 with desired other conditions in addition to the temperature measured by the temperature sensors TS1 and TS2.

The actual use of the hot water in the hot water storage tank 17 is now explained explicitly. It is assumed that the inner space above the second heat exchanger 22 in the hot water storage tank 17 is more than 40 liters. For example, as a space of 50 liters is available, the engine generator 10 is operated with the controller 29 so that the water in the space is heated to 70° C. Then 50 liters of water at 10° C. are added to 50 liters of the hot water, having 100 liters of warm water at 40° C. which may fill a bath tub of a normal size.

When the space above the first heat exchanger 20 in the hot water storage tank 17 is 100 liters, the engine generator 10 controlled by the controller 29 to heat the water to 40° C. can produce a volume of warm water required for filling the bath tub of a normal size with no addition of cool water.

By setting the operating space (capacity) and the temperature measuring location in the hot water storage tank 17 as mentioned above, the number of start and stop operations of both the engine generator 10 and the re-heating boiler 25 is decreased. Therefore, the engine generator 10 and the re-heating boiler 25 can be improved in the operating life and their thermal output will be minimized hence contributing to the lower cost of the entire system.

The above mentioned system may be modified as follows. As shown in FIG. 1, a mixer valve 34 is provided across a conduit 33 between the hot water storage tank 17 and the hot water supply unit 21, while a conduit 35 is provided for feeding water from the source 31 to the mixer valve 34. The hot water in an upper region of the hot water storage tank 17 maybe as high as 80° C. In that case, the hot water is too high to be delivered from the hot water supply unit 21 for use. The hot water is then mixed with cool water supplied by the mixer valve 34 to have warm water suited for supply to a bath and a kitchen.

Controlling of the mixer valve 34 is conducted as follows. The conduit 35 remains closed when the hot water in the hot water storage tank 17 is not higher than the reference temperature Tref-2 and is opened when higher than the reference temperature Tref-2 to add cool water to the hot water in the conduit 33 and the tank 17. The mixer valve 34 is preferably variable in its opening.

The cogeneration system of the embodiment may comprise a plurality of units. Shown in FIG. 1 are the cogeneration unit 10 as a first unit U1, the re-heating boiler 25 as a second unit U2, and a combination of the hot water storage tank 17, the three directional valve 26, and the mixer valve 34 as a third unit U3. Since those units are connected to each other by conduits, they can be positioned according to various conditions at the installation site. Also, the power/thermal output of the cogeneration unit 10, the thermal output of the re-heating boiler 25, and the size/capacity of the hot water storage tank 17 can arbitrarily be determined depending on the needs of a user. Moreover, the re-heating boiler 25 and the hot water storage tank 17 may favorably be selected from commonly available commercial products.

The units are not limited to the arrangement shown in the figure. For example, the pump 19 in the unit U1 may be located in the unit U3. The three-directional valve 26 and the mixer valve 34 in the unit U3 may be accompanied with externally mounted or outside conduits. The controller 29 and the hot water controller 30 may be implemented by a microcomputer. In that case, the two controllers can integrally be controlled with a single CPU.

The re-heating boiler 25 and the hot water storage tank 17 in the units U1 to U3 may be of a wall-mounting type. The re-heating boiler 25 and the hot water storage tank 17 of the wall-mounting type are preferably employed in a compact size system such as a home system, thus minimizing the installation area of the entire system and ensuring more freedom in the conduit arrangement in a 3-dimentional space.

The present invention is not limited to the prescribed embodiments but may be realized in a variety of modified forms. For example, the thermal loads are not limited to the hot water supply unit 21 and the heating system 24 while the number of the units is of no limitation. In a system where the consumption of thermal energy at the heating system 24 is smaller in comparison with the capacity of the hot water storage tank 17, the re-heating boiler 25 and the three-directional valve 26 may be eliminated.

The embodiments of the present invention are not limited to the engine generators as power generator systems utilizing the waste heat but may successfully be used as other power systems including a fuel cell generator.

As set forth above, the aspects of the present invention according to claim 1 to 6 permit the power generator system to produce and provide a proper combination of thermal outputs in response to two different demands of heat. The operation of the power generator system is easily controlled as operated with the results of measurement given by the temperature sensors but not by examining directly the demands of heat. In particular, the aspect of the present invention according to claim 2 can support a change in the temperature profile in the hot water storage tank by means of a couple of location contemplated temperature sensors.

While the apparatus of the present invention enables to minimize loss of the thermal energy by precisely controlling the start and stop of the power generator, it is effectively used with its thermal energy-oriented operations as a household energy source such as a central heating system particularly in cold districts where the demand of heat is higher.

According to claim 5, the present invention is responsive to an abrupt variation of the demand of heat, which is not successfully supported only with waste heat from the power generator. Also, the second heat exchanger is compatible for use in taking out and transferring thermal energy from the hot water storage tank to the second thermal requirement and for use in supplying the hot water storage tank with thermal energy generated by the re-heating boiler.

According to claim 6, the present invention allows the engine generator to operate for generating a constant output of power and to be stopped when the heat generation in the engine generator is over the current demand of heat, hence reducing the consumption of fuel and maintaining the exhaust gas to a favorable level while ensuring the long life of the engine.

What is claimed is:

1. A cogeneration apparatus comprising:
   a power generator;
   a hot water storage tank for storing a first hot water heated by waste heat from the power generator;
   a first heat exchanger provided in the hot water storage tank for producing the first hot water;
   a second heat exchanger provided above the first heat exchanger in the hot water storage tank for drawing heat from the first hot water to produce a second hot water;
   a first temperature sensor provided between the uppermost end of the first heat exchanger and the lowermost end of the second heat exchanger; and
   a controller arranged responsive to a temperature detected by the first temperature sensor for controlling the operation of the power generator.

2. A cogeneration apparatus according to claim 1, further comprising a second temperature sensor provided above the second heat exchanger and wherein the controller drives the power generator either when a temperature detected by the first temperature sensor is not higher than a first reference temperature or when a temperature detected by the second temperature sensor is not higher than a second reference temperature which is set higher than the first reference temperature.

3. A cogeneration apparatus according to claim 2, wherein the power generator is stopped when the temperature detected by the first temperature sensor exceeds a third reference temperature which is set higher than the first reference temperature.

4. A cogeneration apparatus according to claim 2, wherein the first reference temperature is set to a higher level than the temperature of hot water required by a thermal load to which the second hot water is supplied.

5. A cogeneration apparatus according to claim 1, further comprising a re-heating boiler provided on a hot water passage connected to the second heat exchanger, and a valve means for switching between one operation of conveying the second hot water from the re-heating boiler to the thermal load connected across the hot water passage and the other operation of returning back at least a portion of the hot water to the second heat exchanger while bypassing the thermal load.

6. A cogeneration apparatus according to claim 1 wherein the power generator is an engine generator which is interconnected with a commercial power system and driven according to a driving command from the controller to generate a constant rate of an electric power.

* * * * *